United States Patent [19]

Kondo et al.

[11] Patent Number: 4,532,869

[45] Date of Patent: Aug. 6, 1985

[54] PALLET CONVEYING SYSTEM

[75] Inventors: Hirokazu Kondo; Shigekatsu Takino, both of Osaka, Japan

[73] Assignee: Tsubakimoto Chain Company, Osaka, Japan

[21] Appl. No.: 423,375

[22] Filed: Sep. 24, 1982

[30] Foreign Application Priority Data

Aug. 24, 1982 [JP] Japan .................................. 57-14557

[51] Int. Cl.³ .............................................. B61B 13/00
[52] U.S. Cl. .................................... 104/166; 104/251; 104/252; 104/38; 104/35
[58] Field of Search ........ 104/165, 166, 168, 249–252, 104/35–38, 49, 50

[56] References Cited

U.S. PATENT DOCUMENTS

| 3,192,873 | 7/1956 | Tullis .................... | 104/50 X |
| 3,356,040 | 12/1967 | Fonden ................. | 104/172 B X |
| 3,818,837 | 6/1974 | Jacoby et al. .......... | 104/166 |
| 3,842,752 | 10/1974 | Harwick ................ | 104/166 |
| 3,903,810 | 9/1975 | Jones .................... | 104/166 |
| 4,036,148 | 7/1977 | Jones et al. ........... | 104/166 |
| 4,059,053 | 11/1977 | Jones .................... | 104/166 X |
| 4,086,854 | 5/1978 | Scheel .................. | 104/166 |
| 4,353,306 | 10/1982 | Rohrbach et al. ..... | 104/166 |
| 4,428,300 | 1/1984 | Ziegenfus et al. .... | 104/166 |

FOREIGN PATENT DOCUMENTS

785095 12/1980 U.S.S.R. ................................. 104/35

Primary Examiner—Randolph A. Reese
Assistant Examiner—Glenn B. Foster
Attorney, Agent, or Firm—Flynn, Thiel, Boutell & Tanis

[57] ABSTRACT

A pallet conveying system comprising pallet guide rails supported on a frame, a driving shaft extending along the guide rails, motors for driving the driving shaft, a turntable mechanism disposed at the end of the pallet guide rails and having changeover rails alignable with the guide rails and a changeover driving shaft connectable to the driving shaft, a driven roller pivotally attached to the underside of a pallet and pressed against the circumference of the driving shaft with the axis of rotation thereof inclined with respect to the axis of the driving shaft, levers projecting from the front and the rear ends, respectively, of the pallet for causing the axis of rotation of the driven roller to be moved parallel to the axis of the driving shaft when the levers are retracted, and pallet stopping and positioning mechanisms each disposed at a predetermined position on the guide rails and adapted to cause the axis of rotation of the driven roller to be approximately parallel to the axis of the driving shaft and to hold a stopping pin projecting from the underside of the pallet.

9 Claims, 11 Drawing Figures

PALLET CONVEYING SYSTEM

FIELD OF THE INVENTION

This invention relates to a pallet conveying system suitable for automatically attaching parts to a lightweight base plate or chassis.

BACKGROUND OF THE INVENTION

Generally, in attaching various parts to a lightweight base plate adapted to be incorporated into an electric apparatus such as a television set or stereophonic unit or to the body of a mechanical apparatus, such base plate or body is normally mounted on a pallet and is conveyed. The pallet is stopped at an assembly station, necessary parts are attached manually or with robots to the base plate or body mounted on the pallet, then the pallet carrying the base plate or body is conveyed to the next assembly station, and then similar assembling processes are repeated while the pallet is conveyed along pallet guide rails.

The pallet conveying passages employed in such an assembling process are formed in a closed passage or loop consisting of a conveying side along which the pallet is moved and stopped for assembling works and a return side along which empty pallets are returned, which sides are connected at the respective opposite ends by lifters, traversers and/or turntables.

A plurality of assembling stations are arranged along the pallet conveying passage. Automatic assembly robots or assemblers are positioned at the assembling stations. The pallet has to be stopped at each assembling station until the assembling work is completed. Particularly in robotizing the automatic assembling work, the positioning accuracy in stopping a pallet carrying the body is as severe as 50 $\mu$ or below. Further, the shock on the pallet during starting and during stopping must be mitigated to the minimum possible degree. Still further, the pallet conveying system has to be provided with both a collision preventing function to prevent the collision of the following pallet against the preceding pallet when the preceding pallet is stopping and a pallet reserving function. The collision preventing and pallet reserving functions are also necessary for the pallet return passage.

The conventional pallet conveying system employed in incorporating parts to a lightweight base plate or body execute pallet conveyance advantageously by means of frictional driving, which is operated simply for starting and stopping the pallet and is capable of causing less shock on the pallet during starting and stopping. For example, as described in Japanese Patent Publication No. 45568/77, the frictional driving system includes a long rotary shaft disposed along the pallet guiding rails and a driven roller attached to the underside of the pallet so as to be controlled in respect of the swiveling angle and to be pressed against the circumference of the rotary shaft. This arrangement is capable of easily starting and stopping the pallet by simply controlling the inclination of the driven roller relative to the rotary shaft and, since the driven roller is driven by the rotary shaft through frictional engagement, such system is advantageous in that less shock is imposed on the pallet during starting and stopping. On the other hand, this frictional engagement has disadvantages in that the accuracy of stopping the pallet at a fixed position is reduced, the initial starting motion is delayed, the accuracy of stopping the pallet at a fixed position is further reduced due to displacement of the stopping pallet from the correct stopping position caused by collision of the following pallet against the preceding pallet from behind owing to the incapability of absorbing the inertia of the following pallet, and thus the robotization of an automatic assembling system is impossible. Furthermore, the pallet of the abovementioned patent publication has a front lever guiding cam extending rearward from the rear end thereof and is not provided with a rear lever which is similar to the front lever, and therefore collision prevention and reservation of the pallet in the return passage are impossible.

This invention has been made to eliminate those disadvantages of the conventional pallet conveying system and to provide a pallet conveying system provided with new functions such as block control of the pallet, efficient supply of conveyance controlling power and improved assembling efficiency through provision of increased number of automatic assembling stations. An embodiment of the present invention will be described hereunder with reference to accompanying drawings.

BRIEF DESCRIPTION OF THE DRAWINGS

The drawings show a pallet conveying system embodying the present invention, in which.

DETAILED DESCRIPTION

Figure 1:
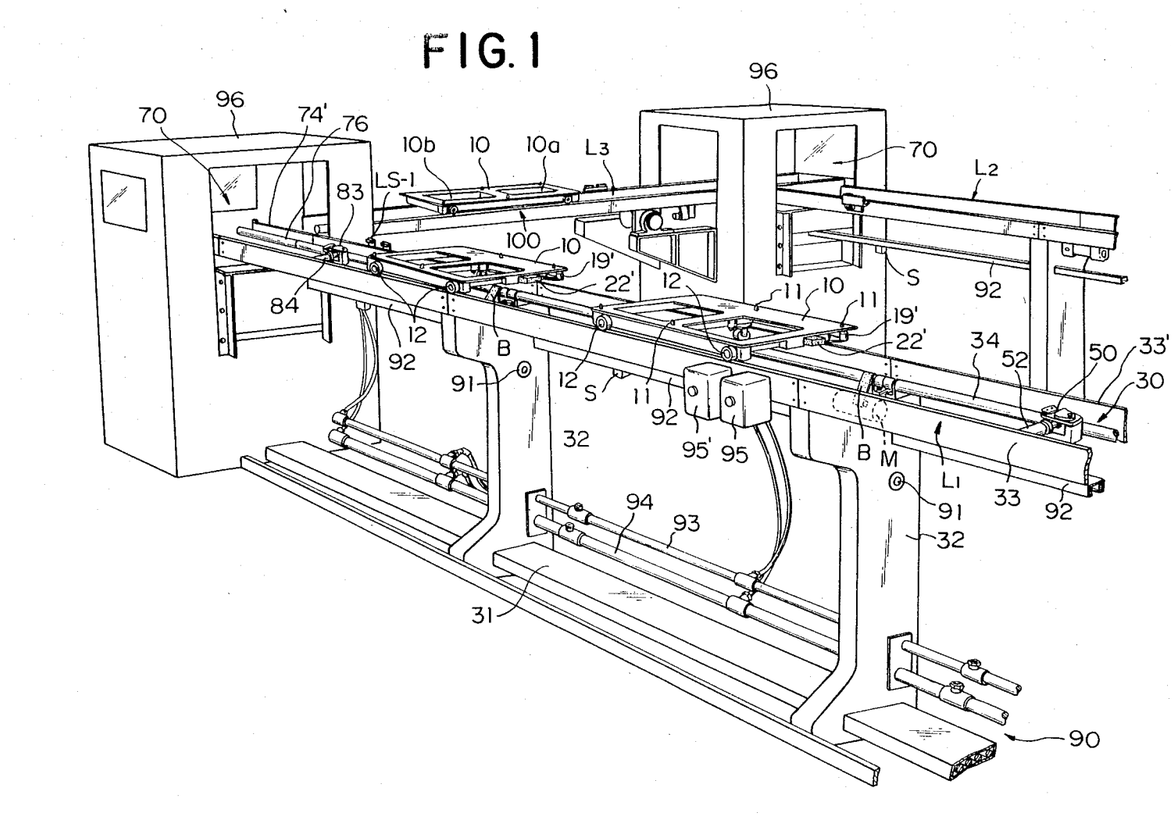
FIG. 1 is a perspective view of the essential part of the pallet conveying system.

Referring to FIG. 1, a pallet conveying system according to the present invention has pallets 10, a pallet conveying mechanism 30, pallet positioning mechanisms 50, turntable mechanisms 70 and a power supply mechanism 90.

A base plate or a body is mounted on each pallet 10. Two through holes 10a and 10b are formed in each pallet 10 for facilitating assembling work from under the base plate or body mounted on the pallet. A plurality of positioning jigs 11 for determining the proper mounting position are provided on the upper surface of the pallet.

Figure 2:
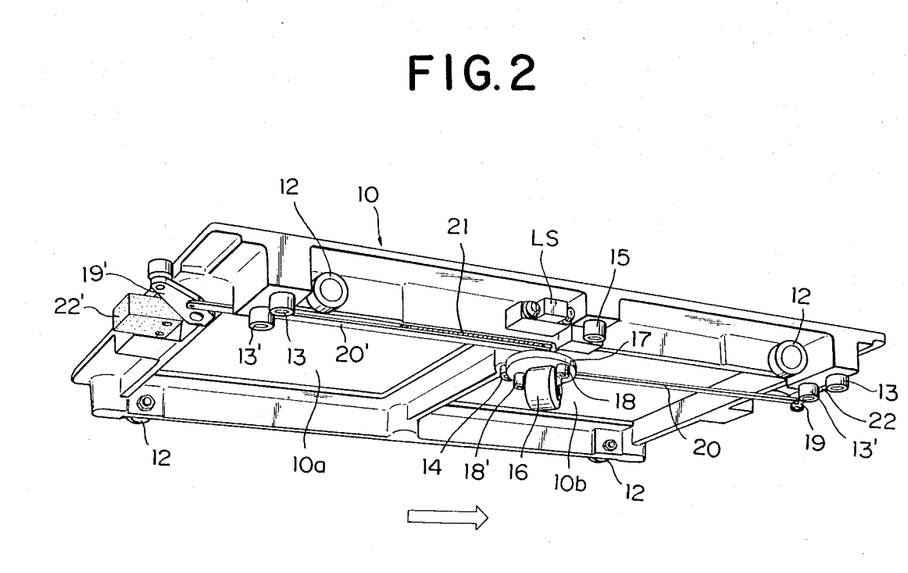
FIG. 2 is a perspective view of the underside of the pallet.

As shown in FIG. 2, a plurality of wheels 12 are provided at the corners of the underside of the pallet 10. Two pairs of guide rollers 13 and 13' are provided on one side of the front and rear ends of the underside of the pallet so as to receive one of a pair of guide rails 33 and 33' (FIG. 1), on which the wheels 12 roll, between each pair of guide rollers 13 and 13', for guiding the pallet 10 along the guide rails. A stop pin 14 for stopping the pallet is disposed in the middle of the underside of the pallet. A locking pin or locking pins 15 and a sensing member or sensing members LS (i.e., limit switches) are provided on one side or on both sides of the underside of the pallet. Since the guide rollers 13 and 13' are provided on only one side of the front and rear ends of the pallet, smooth running of the pallet is allowed irrespective of any error in the space between the guide rails. Therefore, increased accuracy of the space between the guide rails is not necessary.

A driven roller 16 held by a swivel plate 17 adapted to swivel together with the driven roller 16 about a vertical axis is disposed near the stop pin 14. One or two cam pins 18 and 18' symmetrically positioned are provided on the swivel plate 17. Levers 19 and 19' are pivotally attached to the front and rear ends, respectively, of the underside of the pallet 10 and are linked by means of connecting rods 20 and 20', respectively, to the swivel plate 17 at diametrically opposite positions thereon. The swivel plate 17 is urged by a spring 21 extended between the swivel plate 17 and the pallet body in a rotational direction which causes the levers 19 and 19' to project frontward and rearward from the front and rear ends, respectively, of the pallet and which also causes the axis of rotation of the driven roller 16 to diagonally intersect the axis of rotation of a pallet driving shaft, which will be described below.

Blocklike pushing member 22 and 22' for pushing the levers 19 and 19', respectively, of leading or trailing pallets are fixedly attached to the front and rear ends, respectively, of the pallet 10 so as to protrude outward from the pallet body.

Provision of the connecting rods 20, 20' and the pushing members 22, 22' each of the same construction on the front and rear ends of the pallet 10 allows the same functions both in the forward and rearward movements of the pallet.

Figure 3:
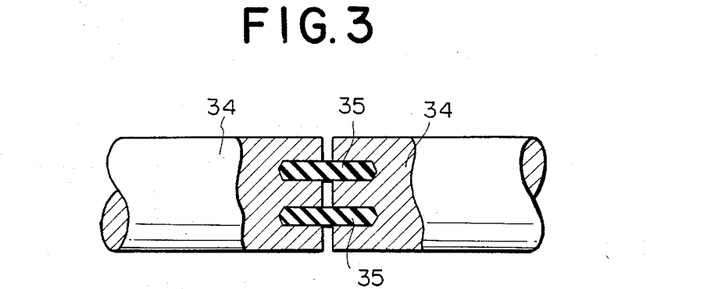
FIG. 3 is a sectional view of the joint of the driving shafts.

As shown in FIG. 1, the pallet conveying mechanism 30 comprises a pair of pallet guiding rails 33 and 33' supported by a plurality of posts 32 erected on base frames 31 and a pallet driving shaft 34 extends along the pallet guiding rails. The pallet driving shaft 34 is sectioned into a plurality of sectional rotary shafts which are driven individually corresponding to the assembling stations. Each sectional rotary shaft 34 is driven by an individual motor M through a belt B. Part of the circumference of each sectional rotary shaft 34 is recessed to accommodate the thickness of the belt B to allow vibrationless passage of the driven roller 16 of the pallet. Each pallet driving shaft 34 may be sectioned into a plurality of sectional shafts as shown in FIG. 3 and the sectional shafts may be coupled with rubber cushioning pins 35 to facilitate the transportation and assembling and disassembling operations corresponding to the layout of the workshop. Such a coupling device has no projection at the joint of the sectional shafts, which is impossible in a conventional flange coupling device, and thus allows smooth movement of the driven roller of the pallet from one sectional shaft to the next. The circumference of the driven roller 16 of the pallet is pressed against the pallet driving shaft 34 so that a rotary power is transmitted from the pallet driving shaft 34 to the driven roller 16. When the axis of rotation of the driven roller 16 intersects the pallet driving shaft 34 diagonally, a component of the driving force of the pallet driving shaft 34 is transmitted to the driven shaft 16 and causes the pallet 10 to advance forward. When the axis of rotation of the driven shaft 16 is aligned in parallel to the axis of the pallet driving shaft 34, the driven roller merely turns idle so that the pallet does not advance. When the direction of the axis of rotation of the driven roller 16 is aligned in a reversely diagonal direction with respect to the axis of the pallet driving shaft 34, the pallet 10 is driven in the reverse direction. Such a pallet driving system has already been disclosed in Japanese Patent Publication No. 45568/77 and is publicly known.

Figure 4:
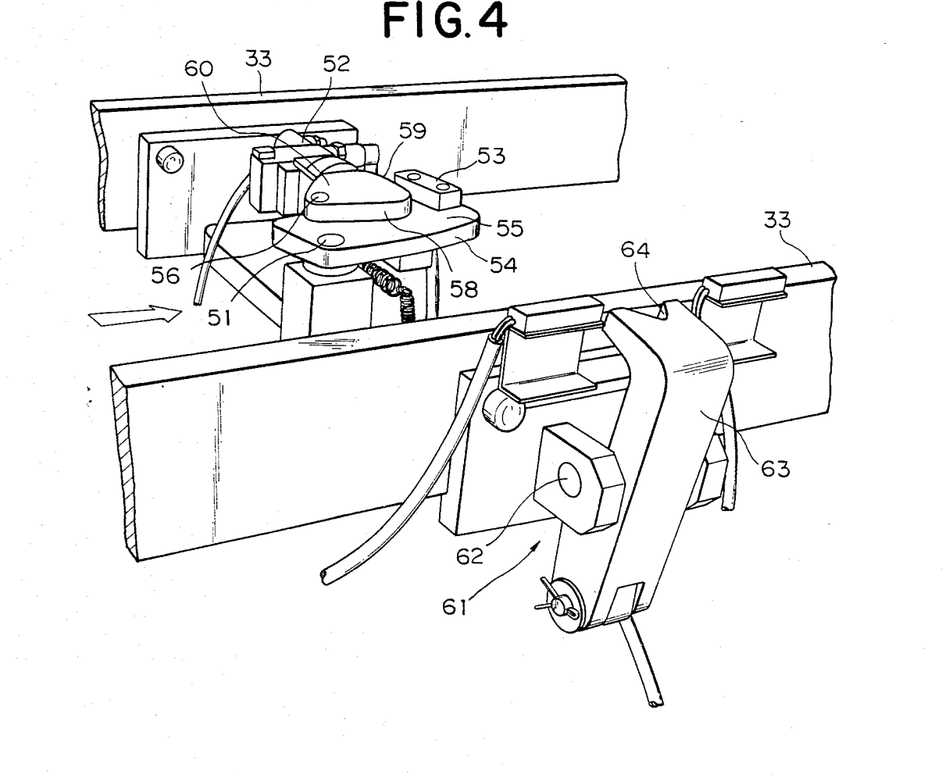
FIG. 4 is a perspective view of the pallet stopping and positioning mechanism.
Figure 5:
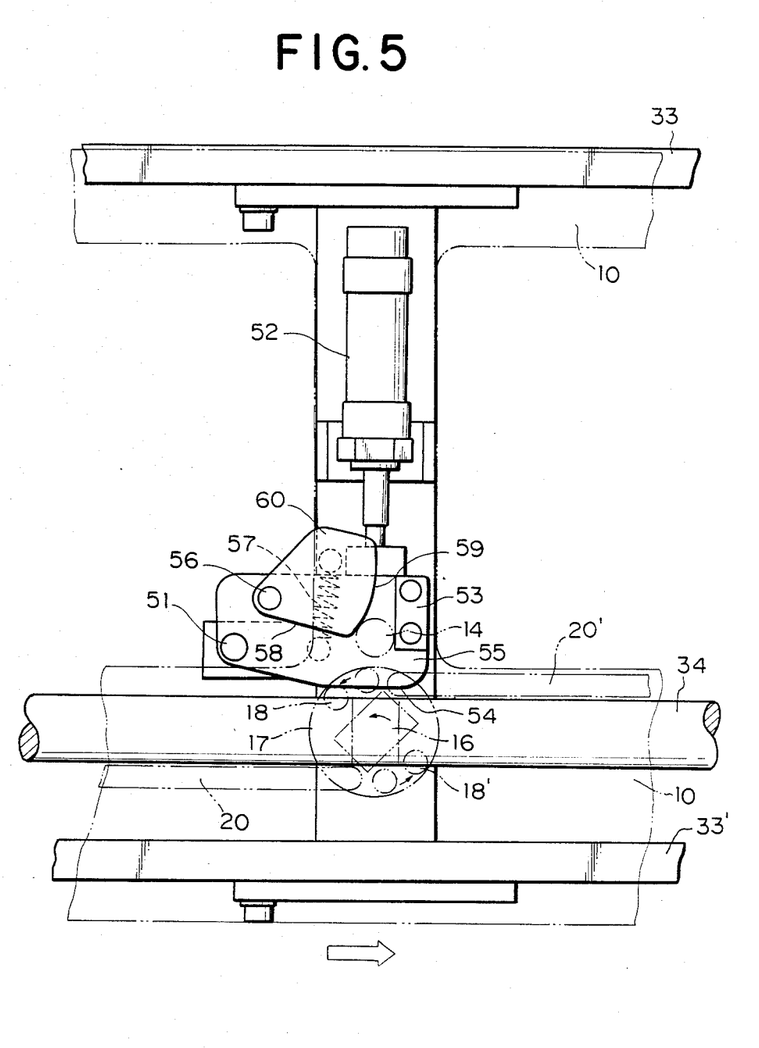
FIG. 5 is a plan view of the pallet stopping and positioning mechanism.
Figure 6:
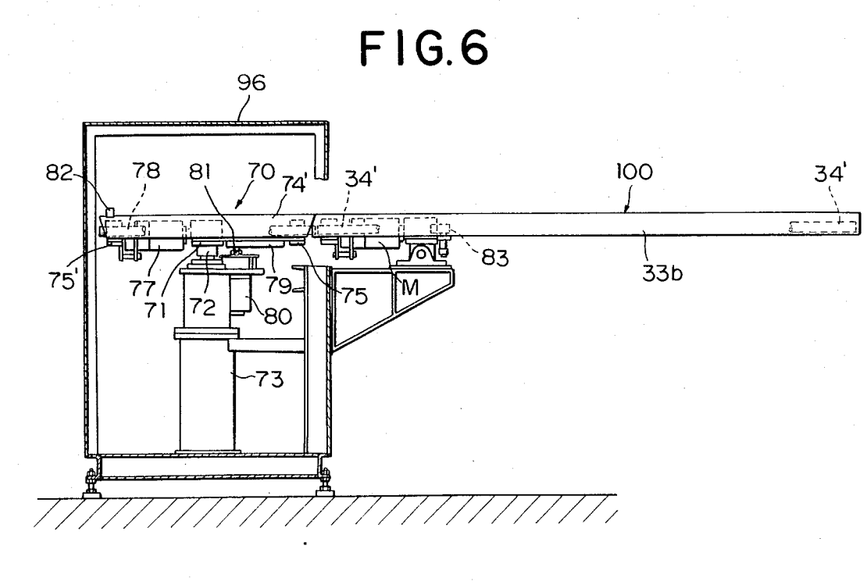
FIG. 6 is a front elevation of the turntable mechanism.

The pallet positioning mechanism 50 is provided to improve the accuracy of robotized assembling operation by accurately stopping the pallet 10 at the assembling station where predetermined parts are attached to the base plate or the like as mounted on the pallet. FIGS. 4 and 5 are detail views of the pallet positioning mechanism 50. The pallet positioning mechanism 50 has a pallet stopping plate 55 disposed between the pallet guide rails 33 and 33' and adapted to be turned on a vertical shaft 51 by means of a power cylinder 52. Plate 55 mounts thereon a stopper 53 which is protrudable into the path of the stop pin 14 of the pallet 10. A cam surface 54 on plate 55 is adapted to retractably enter into the path of the cam pin 18 protruding from the swiveling plate 17 to turn the swiveling plate 17 by pushing the cam pin 18 to turn the axis of rotation of the driven roller 16 to a direction near parallel to the axis of the pallet driving shaft 34 so that a small part of the driving force of the pallet driving shaft 34 is transmitted to the driven roller 16 of the pallet 10. Mechanism 50 also has a positioning plate 60 adapted to be turned on a vertical shaft 56 provided on the stopping plate 55. This positioning plate 60 has a first cam surface 58 urged by a spring 57 so as to protrude into the path of the stop pin 14 of the pallet so that the stop pin 14 engages the cam surface 58 to push the positioning plate 60 against the resilient force of the spring 57 to move the cam surface 58 out of the path of the stop pin 14, and a second curved cam surface 59 for pressing the stop pin 14 against the stopper 53 and simultaneously urging the stop pin 14 toward the guide rail 33'.

At the assembling station, the stop pin 14 of the pallet 10 is kept pressed against the stopper 53 with a small forward-driving force transmitted from the pallet driving shaft 34 to the driven roller 16 and is kept held between the curved cam surface 59 and the stopper 53 with the action of the curved cam surface 59. Therefore, there is no possibility of the pallet 10 moving in the reverse direction, and accurate longitudinal positioning of the pallet is attained by means of the stopper 53. Furthermore, since the stop pin 14 is pressed toward the guide rail 33' by the force of the spring 57 acting through the curved cam surface 59, and the pallet 10 is pressed toward the guide rail 33' by the reactive force of the cam pin 18 of the swiveling plate 17 being pressed against the cam surface 54 of the stopping plate 55 by the force of the spring 21, the inner guide rollers 13' as provided at the front and rear ends of the pallet are pressed against the inside surface of the guide rail 33', whereby accurate lateral positioning of the pallet is attained on the basis of the inside surface of the guide rail 33'.

A locking device 61 is attached to the outside surface of the guide rail 33' at the pallet stopping position as shown in FIG. 4. A locking lever 63, which is swingable on a horizontal lateral shaft 62 attached to the outside surface of the guide rail 33', is joined at the lower end thereof to the free end of the piston rod of a locking power cylinder (not shown) which is controlled by a command signal, and is also provided with a V-shaped groove 64 formed in the upper end thereof for engaging the locking pin 15 provided on the side of the pallet 10. After the pallet 10 has been positioned, the locking power cylinder is actuated to swing the locking lever 63 to engage the locking pin 15 in the groove 64 so that the pallet 10 will not be displaced by an external force during the assembling operation.

The pallet 10 is conveyed by being driven by the driving shaft 34 along the guide rails 33 and 33'. When the pallet 10 arrives at an assembling position, the pallet 10 is stopped accurately at a fixed position by the function of the pallet positioning mechanism 50, which is operated by the power cylinder 52 actuated by a command signal, then a robot (not shown) disposed beside the guide rail is actuated by a pallet stop detection signal to execute a predetermined assembling operation according to a computer program. When the following pallet approaches the preceding pallet as stopped at the assembling position, the roller attached to the free end of the lever 19 which projects from the front end of the following pallet comes into contact with the pushing member 22' projecting from the rear end of the preceding pallet. This causes the lever 19 of the following pallet to be pushed into the retracted position, whereby the swiveling plate 17 is turned through the connecting rod 20 against the force of the spring 21. At the same time, the lever 19' projecting from the rear end of the following pallet also is retracted by the connecting rod 20' due to the turning of the swiveling plate 17.

The turning of the swiveling plate 17 on the following pallet causes the axis of rotation of the driven roller 16 to change from the diagonal position with respect to the pallet driving shaft 34 to a reversely diagonal position past the parallel position. The length of rearward projection of the pushing member 22' or the length of forward projection of the lever 19 is adjusted so that the position of the axis of rotation of the driven roller 16 of the following pallet is changed to the reversely diagonal position with respect to the axis of the pallet driving shaft 34 immediately before the front end of the following pallet comes into contact with the rear end of the stopped preceding pallet. Consequently, the advancing following pallet is decelerated while the driven roller 16 is turned from the diagonal position to the parallel position, and transmission of the forward driving force to the following pallet is interrupted when the axis of rotation of roller 16 is brought into the parallel position, and a reverse driving force is transmitted to the following pallet when the axis of rotation of the driven roller 16 is in the reversely diagonal position relative to shaft 34. This reverse driving force brakes the following pallet and absorbs the inertia of the pallet to prevent its collision against the stopped preceding pallet, and causes the following pallet to move in the reverse direction until the axis of rotation of the driven roller is turned by the reverse movement of the following pallet to the parallel position. Thus, the following pallet is stopped with a space between the rear end of the preceding pallet and the front end of the following pallet. Other preceding and following pallets are also separately stopped in the same manner and their positions are sequentially maintained.

The starting movement of the preceding pallet away from the assembling position (due to sideward retraction of stop 53 and plate 55 by cylinder 52) allows the front lever 19 of the following pallet to be projected forwardly due to the urging of spring 21, whereby the axis of rotation of the driven roller 16 is returned to the diagonal position so that the following pallet again advances. Since the other following (i.e., the reserve) pallets are separately stopped as described hereinbefore, there is no possibility that the start of the preceding pallet is accompanied by the start of the reserve pallets, whereby smooth initial movement of the pallets is attained due to their sequential start up.

Turntable mechanisms 70 are installed at the opposite ends of a pallet relaying line 100 for connecting the assembling and pallet conveying lines. FIGS. 6 to 11 are detail views of the turntable mechanisms 70.

As regards the turntable mechanism designated 70a, a vertical rotary shaft 72 supporting the turntable 71 is rotatably received in a post 73 at the intersecting point of the respective centerline axis of an assembling and conveying line L1 and the relaying line L3 or 100. Relaying line 100 is arranged perpendicular to the assembling and conveying line L1 and L2. Changeover rails 74 and 74' are mounted on the turntable 71 so as to be connected to and separated from the pallet guide rails 33, 33'. Front and rear cross beams 75, 75' extend between the changeover rails 74 and 74' at the underside thereof. A changeover driving shaft 76 adapted to be connected to and separated from the driving shafts 34 extends between and is mounted on the cross beams 75 and 75'. The changeover driving shaft 76 is driven through a belt 78 by a motor 77 attached to the rear cross beam 75'.

A channel member 79 is disposed between the turntable 71 and the front cross beam 75 in alignment with a line which passes through the vertical rotary shaft 72 and is parallel to the changeover rails 74 and 74'. The free end of a swing lever 81 as fixed on the shaft of a reduction gear motor 80 fixed to the post 73 is fitted in the elongated channel of the channel member 79 for free sliding motion therealong. The swing lever 81 is disposed so as to be perpendicular to the channel of the channel member 79 when the changeover rails 74 and 74' are aligned with either the guide rails 33 and 33' of the conveying line or the guide rails 33a and 33b of the relaying line. Accordingly, a right-angled triangle is formed by lines connecting the center of rotation of the vertical rotary shaft 72, the center of rotation of the swing lever 81 and the position of the free end of the swing lever 81 lying perpendicularly to the channel. Since the pallet conveying lines perpendicularly intersect, the line connecting the center of rotation of shaft 72 to the center of rotation of lever 81 hence extends at a 45° angle relative to the longitudinal axis of the channel member 79. Therefore, when the changeover rails 74 and 74' are aligned with the guide rails 33 and 33' of the conveying line, as well as when the changeover rails 74 and 74' are aligned with the guide rails 33a and 33b of the relaying line, the turntable 71 is locked to prevent turning and will not be moved due to an external turning force being applied to the changeover rails 74 and 74'. Furthermore, since the free end of the swing lever 81 performs a linear motion along the channel of the channel member 79, not withstanding the swinging movement of the lever 81 when motor 80 is energized, the angular speed of the turntable increases and decreases at the start and at the stop, respectively, of the turning motion of the turntable. Hence the pallet is not subjected to shocks and is transferred smoothly from one line to the other. A stopping member 82 for engaging the front edge of an incoming pallet is provided at the rear end of the changeover rail 74'.

A turning control mechanism for the turntable 71 will be described hereunder.

At a waiting position where the pallet 10 is kept waiting for transfer to the changeover rails 74 and 74' of the turntable 71, there are provided a stopping plate 83 having a cam surface adapted to be retractably projected into the path of the cam pin 18 projecting from the swiveling plate 17 of the pallet to engage with and push the cam pin 18 to make the axis of rotation of the driven roller parallel to the axis of the driving shaft 34, a power cylinder 84 for actuating the stopping plate 83, and a limit switch LS-1 for detecting arrival of the pallet 10. This mechanism corresponds to the positioning mechanism 50 described hereinbefore. Provided at respective fixed positions adjacent the turntable are a normally open limit switch LS-2 which is actuated by the rear end of the changeover rail 74' for signaling the reception turn completion after the changeover rails 74 and 74' have been aligned with the pallet guide rails 33 and 33' of the assembling and conveying line, and a normally open limit switch LS-3 which is actuated by the rear end of the changeover rail 74 for signaling the sending turn completion after the changeover rails 74 and 74' have been aligned with the guide rails 33a and 33b of the relaying line. A limit switch LS-4 is mounted at the rear end of the changeover rail 74' and is actuated by the pallet after transference of the pallet 10 to the changeover rails 74 and 74' has been completed. A limit switch LS-5 is provided at a fixed position at the starting end of the guide rail 33b of the relaying line to detect the delivery of the pallet from the changeover rails 74 and 74'.

When the pallet arrival detection limit switch LS-1 is actuated upon arrival of the pallet on the guide rail 33, 33' of the assembling and conveying line immediately before the turntable 70a, the power cylinder 84 for operating the stopping plate 83 will not operate if the reception turn completion detecting limit switch LS-2 is closed indicating that the changeover rails 74 and 74' are aligned with rails 33 and 33'. At this time, the transfer completion detecting limit switch LS-4 is opened and the motor 77 turns in the normal direction to turn the changeover driving shaft 76 in a direction the same with that of the rotation of the driving shaft 34. Thus, the pallet 10 is moved onto the changeover rails 74 and 74', closes the transference completion detecting limit switch LS-4 so that the motor 77 is stopped, and stops when it comes in contact with the stopping member 82. Then, the reduction gear motor 80 is started to turn the swing lever 81 in a counterclockwise direction in FIG. 7 causing the free end of the swing lever 81 to move leftward within the channel of the channel member 79. Consequently, the turntable 71 is turned in a counterclockwise direction on the vertical rotary shaft 72. The reduction gear motor 80 is stopped when the sending turn completion detecting limit switch LS-3 is closed by engagement with the rear end of the changeover rail 74, whereby the changeover rails 74 and 74' and the guide rails 33a and 33b of the relaying line are aligned, and this then actuates the motor 77 to turn in the reverse direction which is the same as that of the driving shaft 34' of the relaying line 100. Consequently, the pallet 10 is transferred from the changeover rails 74 and 74' onto the guide rails 33a and 33b of the relaying line.

When the delivery detecting limit switch LS-5 is actuated by the pallet 10 as it passes the limit switch LS-5, the motor 77 is stopped and the reduction gear motor 80 is actuated to turn in the reverse direction so that the turntable 71 is turned in a clockwise direction through the clockwise turning of the swing lever 81. When the changeover rails 74 and 74' and the guide rails 33 and 33' of the assembling and conveying line are again aligned, the changeover rail 74' actuates the reception turn completion detecting limit switch LS-2 to stop the reduction gear motor 80.

When a pallet is mounted on the changeover rails 74 and 74' as well as when the turntable 71 is turning, namely while the transfer completion detecting limit switch LS-4 is closed or if the reception turn completion detecting limit switch LS-2 is open, the closing of the pallet arrival detecting limit switch LS-1 by the arrival of a pallet will actuate the power cylinder 84 to cause the stopping plate 83 to project and push the cam pin 18 projecting from the swiveling plate 17 of the pallet, whereby the axis of rotation of the driven roller 16 is made parallel to the axis of the driving shaft 34 so that the pallet 10 is caused to stop and wait. When the reception turn completion detecting limit switch LS-2 is closed due to engagement with rail 74', and with the transfer completion detecting limit switch LS-4 open due to absence of a pallet, the power cylinder 84 operates in reverse to retract the stopping plate 83, whereby the axis of rotation of the driven roller 16 is turned to the diagonal position with respect to the axis of the driving shaft 34 by the force of the spring 21, and consequently the pallet advances onto the changeover rails 74 and 74'.

The manner of controlling the turntable mechanism 70b illustrated on the left-hand side of FIG. 7, namely, the turntable for transferring the pallet from the relaying line 100 to the assembling and conveying line L2, will be described hereunder.

When the pallet is conveyed along the relaying line and arrives at a position immediately before the turntable and the pallet arrival detecting limit switch LS-1' is closed, if the reception turn completion detecting limit switch LS-2' is closed and the transfer completion detecting limit switch LS-4' is open, a power cylinder 84' (FIG. 6) for operating a vertical stopping plate 83' will not operate and the motor 77 turns in a reverse direction, which is the same as the direction of turning of the driving shaft 34' of the relaying line 100.

Figure 7:
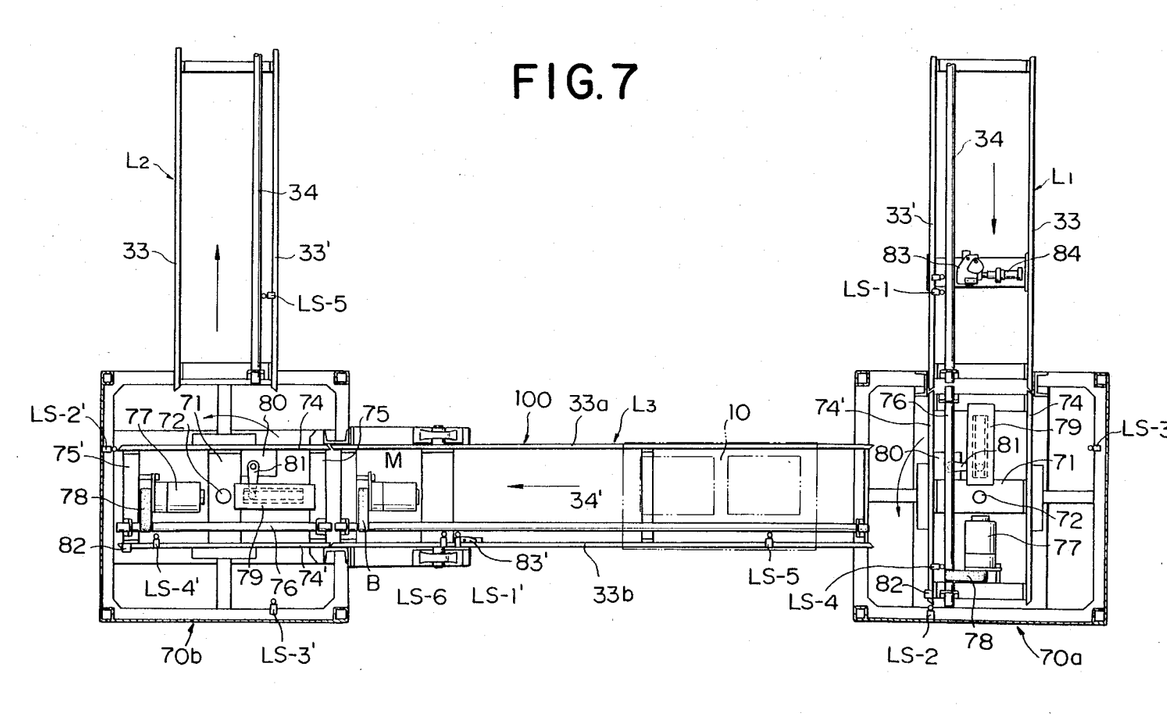
FIG. 7 is a plan view of the turntable mechanism of FIG. 6.

Accordingly, the pallet 10 is transferred from the relaying line 100 onto the turntable, then the pallet 10 closes the transfer completion detecting limit switch LS-4' to stop the motor 77, comes into contact with the stopping member 82 and stops and then, the reduction gear motor 80 is started to turn the swing lever 81 in a counterclockwise direction in FIG. 7 so that the turntable is turned in a counterclockwise direction. When the sending turn completion detecting limit switch LS-3' is closed by the rear end of the changeover rail 74', the reduction gear motor 80 is stopped, the changeover rails 74 and 74' and the guide rails 33 and 33' of the assembling and conveying line L2 are aligned and the motor 77 is actuated to turn in the normal direction, which is the same as the direction of rotation of the driving shaft 34 of the assembling and conveying line L2.

Consequently, the pallet 10 is sent out from the changeover rails 74 and 74' of the turntable onto the guide rails 33 and 33' of the assembling and conveying line L2.

The motor 77 is stopped when the sending completion detecting limit switch LS-5' is closed by the pallet when it passes the limit switch, while the reduction gear motor 80 is actuated to turn in the reverse direction to turn the swing lever 81 in a clockwise direction, whereby the turntable 71 is turned in a clockwise direction. When the changeover rails 74 and 74' are aligned with the guide rails 33a and 33b of the relaying line 100, the changeover rail 74 closes the reception turn completion detecting limit switch LS-2' to stop the reduction gear motor 80.

The control operation when the pallet is carried on the left-hand turntable and while the turntable is turning is similar to that of the right-hand turntable, and therefore the description thereof will be omitted.

It is preferable that the length of the relaying line 100 is as long as is sufficient to reserve or support a single pallet in order to avoid excessive space between the parallel assembling and conveying lines L1 and L2 as well as to save the required floor space of the conveying system.

Accordingly, a sending turn withholding limit switch LS-6 for withholding generation of the sending turn (counterclockwise turning) completion signal of the upstream (i.e., right-hand) turntable is provided at the waiting position adjacent to the pallet arrival detecting limit switch LS-1' to withhold the sending turn operation of the upstream turntable while one pallet is reserved in the relaying line 100, even if the upstream turntable has received a pallet from the assembling and conveying line and the transfer operation has been completed.

Consequently, while a pallet exists at the waiting position on relaying line 100, the reduction gear motor 80 of the upstream (i.e., right-hand) turntable will not start even if the transfer completion detecting limit switch LS-4 is closed, because the sending turn withholding switch LS-6 is closed by the pallet on line 100. When the waiting position is vacant, since the sending turn withholding limit switch LS-6 is open, the reduction gear motor 80 of the upstream turntable is started when the transfer completion detecting limit switch LS-4 is closed to turn the upstream turntable to the sending-out position. Thus, reservation of the pallet in the relaying line 100 is limited automatically to a single pallet.

Figure 8:
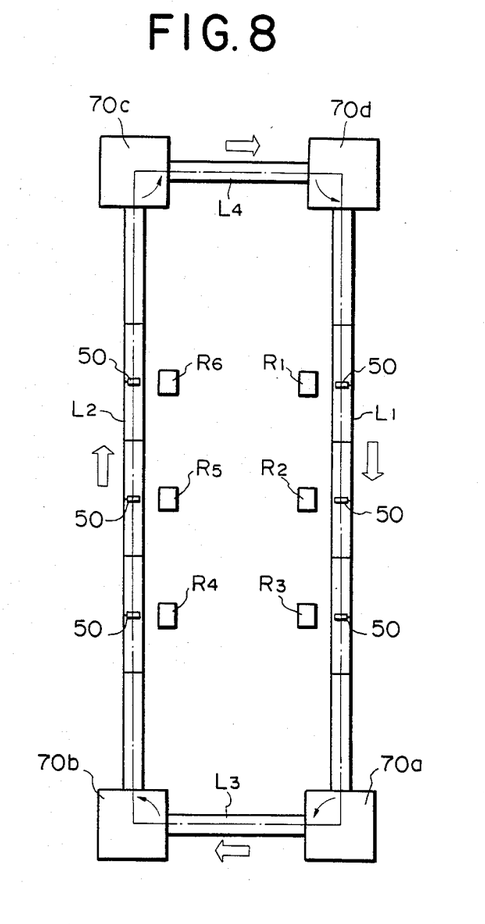
FIG. 8 is a plan view of an exemplary layout of the pallet conveying line embodying the present invention.

FIG. 8 shows the layout of an automatic assembly line in which the pallets circulate in a closed circuit. In this layout, the respective starting ends and ending ends of two parallel assembly lines L1 and L2, each being adapted to convey the pallets in the opposite direction with respect to the other, are connected by relaying lines L3 and L4. Turntable mechanisms 70a, 70b, 70c and 70d as described hereinbefore are disposed at the junctions of those lines. Assembling robots R1, R2, R3, R4, R5 and R6 are installed at the assembling stations of the automatic assembly lines L1 and L2. A computer-aided program-controlled pallet stopping and positioning mechanism 50 is disposed in front of each of the assembling robots R1 to R6. In some cases, the relaying lines L3 and L4 are connected perpendicularly to the assembly lines L1 and L2 to form a T-shaped or cross-shaped layout.

In such a layout, sometimes the pallet is conveyed linearly after passing the turntable without changing the direction of conveyance. Therefore, the stopping member 82 provided at the ending end of the changeover rail of the turntable has to be retractable with respect to the corresponding changeover rail. A power cylinder is provided for projecting and retracting the stopping member 82. Upon arrival of a pallet to be conveyed linearly past the turntable at a waiting position immediately before the turntable, operation of the transfer completion detecting switch LS-4 is withheld while the power cylinder is actuated through program-controlled operation of the computer to retract the stopping member 82 and to allow the pallet to be conveyed past the turntable. The limit switch LS-4 and the power cylinder are reset after the pallet has passed past the turntable.

Thus, the pallet can be transferred to the relaying lines or allowed to be conveyed past the turntable corresponding to the layout of the pallet conveying lines.

Figure 9:
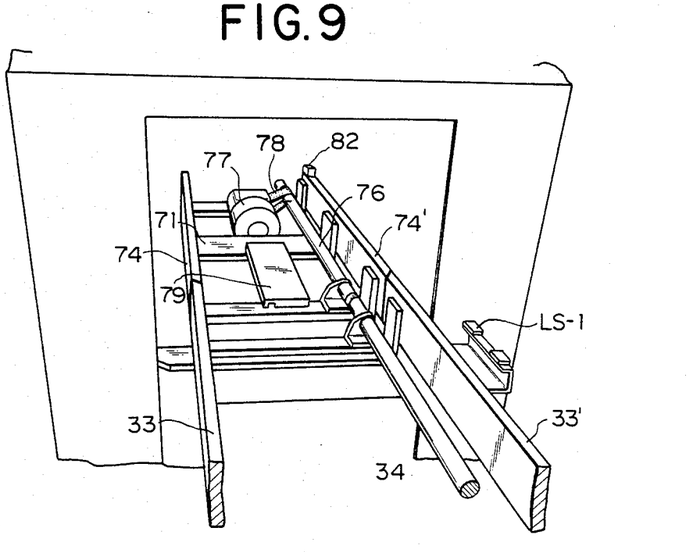
FIG. 9 is a perspective view of the turntable in a state before turning.
Figure 10:
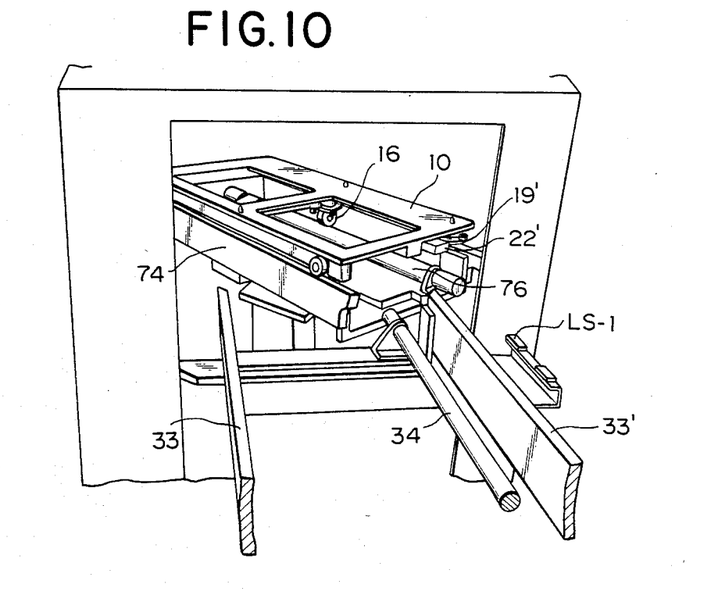
FIG. 10 is a perspective view of the same turntable in a state during turning.
Figure 11:
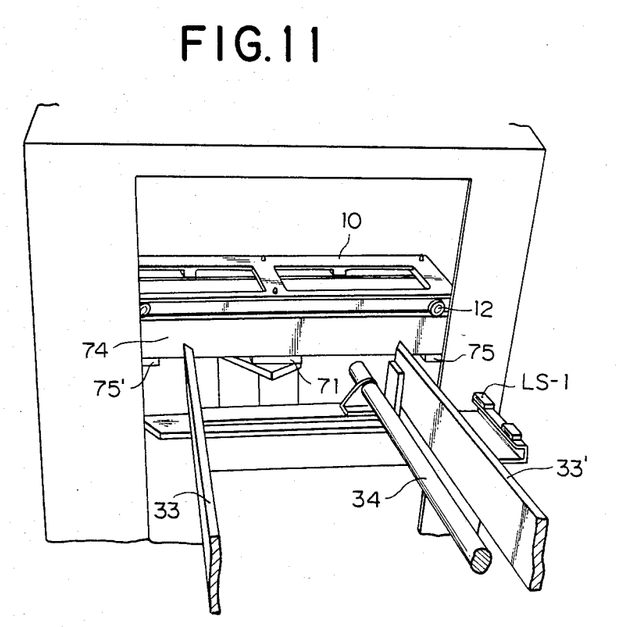
FIG. 11 is a perspective view of the same turntable in a state after the completion of turning.

FIGS. 9 to 11 are explanatory perspective views for facilitating the explanation of the turning motion of the turntable mechanism 70a of FIG. 8, wherein FIG. 9 shows the state before turning, FIG. 10 shows the state during turning and FIG. 11 shows the state after completion of turning.

The power supply mechanism 90 will now be described hereunder with reference to FIG. 1.

Electric wiring for the control system is laid within the base frame 31. Part of the wiring is laid in the hollows of the posts 32. Control switches 91 for starting and stopping motors M for driving the sectional driving shafts 34 are attached to the posts 32. Part of the wiring is connected to a current collecting rail 92 extending along the underside of the guide rails and supported by the posts 32. Sockets S are provided on the current collecting rail 92 to facilitate electric power supply to the related equipment installed beside the conveying line.

A compressed air supply piping 93 and a discharge piping 94 extend along the base frame 31 and are held by the posts 32 at the lower part thereof. The pipings 93 and 94 are connected to the power cylinders 52 of the pallet stopping and positioning mechanisms 50 through switching valves 95 and 95' attached to the outside surface of the guide rail 33.

A control box for simultaneously controlling all the electric power supply system and the air supply system is provided on the housing 96 of the turntable mechanism 70.

Operation of the sectional driving shafts and the stopping and positioning mechanisms is controlled sectionally by operating the corresponding control switches 91 and switching valves 95 and 95'. The control box controls the integral conveying line.

Many small through holes are formed in the side surface of the guide rails for facilitating attaching necessary elements such as switches, pallet locking mechanisms and controllers at optional positions.

In the pallet conveying system according to the present invention, for example, a base plate of a television set is mounted on a pallet 10 and positioned over one of the holes 10a by means of a jig 11 while parts to be attached to the base plate are mounted on the pallet and positioned over the other hole 10b by means of a jig 11, the pallet 10 is driven by the driving shaft 34 to move along the automatic assembly line, the pallet is stopped and accurately positioned by the stopping and positioning mechanism 50 at an assembling station, the parts are attached to the base plate by the assembling robot R in the program-controlled order, the pallet is advanced again through the reverse operation of the pallet stopping and positioning mechanism 50 to the next assembling station where the pallet is stopped and positioned again by means of the corresponding stopping and positioning mechanism and the parts are assembled in the similar manner. Such assembling and advancing operations are repeated and finally the pallet is transferred to the next assembly line by the turntable mechanism 70.

In case an accident occurs at an assembly station, the sectional driving shaft 34 of the corresponding section is stopped through operation of the corresponding control switch 91 to treat the accident. While the accident is being treated, the following pallets stop automatically and successively through the function of the levers 19 and 19' projecting from the front and the rear ends, respectively, of each pallet.

The employment of the pallet conveying system of the present invention thus makes possible robotized and continuous assembling process, improvement of assembling accuracy and effectively limiting the excessive floor space of the integral assembling system.

What is claimed is:

1. A pallet conveying system for a pallet having stop and lock pins projecting therefrom, comprising pallet guide rails supported on a frame, a driving shaft extending along said guide rails, motor means for driving said driving shaft, a turntable mechanism disposed at the end of said pallet guide rails and having changeover rails alignable with said guide rails and a changeover driving shaft alignable with said driving shaft, a driven roller pivotally attached to the underside of a pallet and urged so as to be pressed against the circumference of said driving shaft with the axis of rotation thereof diagonally positioned with respect to the axis of said driving shaft, front and rear lever means pivotally mounted on and projecting from the front end and the rear end, respectively, of the pallet, link means connected between said driven roller and said front and rear lever means for causing the axis of rotation of said driven roller to be parallel to the axis of said driving shaft when either said lever means is retracted, a pallet stopping and positioning mechanism disposed at a predetermined position adjacent said guide rails for causing the axis of rotation of said driven roller to be approximately parallel to the axis of said driving shaft and for stationarily holding the stop pin projecting from the underside of the pallet when the mechanism is in a projected position, the mechanism including a stopper and a movable positioning member positioned adjacent the stopper for holding the stop pin therebetween, means for moving the mechanism into a retracted position, and locking means movable into a locking position for engaging and stationarily holding said lock pin when the pallet is stopped by said mechanism.

2. A system according to claim 1, wherein said locking means includes a locking lever swingably supported adjacent one of said guide rails and being swingable transversely thereof into locking engagement with said lock pin, said locking lever having a forked end which engages said lock pin.

3. A system according to claim 1, wherein the stopping and positioning mechanism includes a stopping member movable between said projected and retracted positions, said stopping member having said stopper mounted thereon, and said positioning member being movably mounted on said stopping member.

4. A pallet stopping and positioning mechanism for a pallet conveying system, which pallet conveying system includes pallet guide rails supported by a frame and a driving shaft extending along said guide rails and adapted to drive a pallet along said guide rails through pressure-contact with a driven roller pivotally attached to the underside of the pallet, and is adapted to advance and stop the pallet through controlling the angular position of said driven roller, comprising a cam pin provided on a swiveling plate so as to project therefrom, said swiveling plate being fixed to the vertical swivel shaft of said driven roller and adapted to urge said driven roller so as to make axis of rotation of said driven roller diagonal with respect to the axis of said driving shaft, a stopping plate disposed between said guide rails and supported on a substantially vertical axis for swinging movement between projected and retracted positions, a power cylinder unit for controlling movement of the stopping plate between said projected and retracted positions, said stopping plate having a cam surface thereon which, when the stopping plate is in said projected position, projects into the path of said cam pin to push the cam pin against the force urging said driven roller to the diagonal position to cause said swiveling plate to turn to a position where the axis of rotation of said driven roller is approximately parallel to the axis of said driving shaft, said cam surface being retracted from said path when the stopping plate is in said retracted position, a stopper mounted on the stopping plate to engage and stop a stop pin projecting from the underside of the pallet when said stopping plate is in said projected position, and a pallet positioning plate pivotally mounted on said stopping plate for movement relative thereto about a substantially vertical axis, said positioning plate having a cam surface for pressing the stop pin against the stopper as well as sideways toward one of said guide rails, said positioning plate being spring urged into a position of engagement with the stop pin when the stopping plate is in said projected position, the cam surface on said positioning plate being disposed and cooperating with a surface on the stopper for defining a wedgelike slot which projects sidewardly and wedgingly receives the stop pin therein.

5. A mechanism according to claim 4, including a locking mechanism positioned adjacent the guide rails and having a locking member which is movable into a locking position for engaging a locking pin provided on the pallet which is stopped by the stopping plate to prevent movement of the pallet due to application of external forces thereto.

6. A mechanism according to claim 5, wherein the locking member is pivotally mounted adjacent one of the guide rails and is swingable transversely relative to the guide rail, the locking lever having notch means therein for permitting the locking lever to longitudinally straddle the locking pin on the pallet, said locking lever being swingable into engagement with the pallet in a sideward direction which is opposite the sideward pressing force imposed on the stop pin by the cam surface on the positioning plate.

7. A mechanism according to claim 5, wherein the pallet has front and rear pairs of side guide rollers mounted thereon adjacent one side thereof, each pair of side guide rollers being positioned to directly straddle one of said guide rails for sidewardly guiding the pallet along the rails, said cam surface pressing the pallet sidewardly toward said one guide rail so that innermost guide rollers of said pairs are pressed against said one rail.

8. A mechanism according to claim 7, including a locking mechanism mounted adjacent one of the rails and having a locking member which is movable into a locking position for engagement with a locking pin projecting from the pallet, said locking member when moved into said locking position being movable sidewardly against the pallet in a direction opposite to the sideward force imposed thereon by the cam surface on the positioning plate.

9. A turntable mechanism for a pallet conveying system, comprising a turntable having a vertical rotary shaft disposed at the point of intersection of perpendicularly intersecting pallet conveying lines, connecting rails mounted on the turntable so as to be alinged with and separated from the corresponding ends of the pallet guide rails of said pallet conveying lines, a pallet driving shaft also mounted on the turntable so as to be in a pressure-contact with the driven roller provided on the underside of the pallet and adapted to be driven both in the normal and the reverse directions, a straight guide channel attached to the turntable in alignment with a line including the center of said vertical rotary shaft and parallel to said connecting rails, and a turntable turning lever member adapted to turn about a point of intersection of a line perpendicular to the longitudinal direction of said guide channel and a line extending from the center of said vertical rotary shaft at an angle $\alpha$ of 45° to the longitudinal axis of the guide channel on a turntable supporting frame and having a free end slidably fitted in said guide channel.

* * * * *